(12) United States Patent
Lee et al.

(10) Patent No.: US 8,190,612 B2
(45) Date of Patent: May 29, 2012

(54) COMPUTER-IMPLEMENTED SYSTEMS AND METHODS FOR VARIABLE CLUSTERING IN LARGE DATA SETS

(75) Inventors: Taiyeong Lee, Cary, NC (US); David Rawlins Duling, Durham, NC (US); Dominique Joseph Latour, Cary, NC (US)

(73) Assignee: SAS Institute Inc., Cary, NC (US)

( * ) Notice: Subject to any disclaimer, the term of this patent is extended or adjusted under 35 U.S.C. 154(b) by 581 days.

(21) Appl. No.: 12/336,874

(22) Filed: Dec. 17, 2008

(65) Prior Publication Data

US 2010/0153456 A1 Jun. 17, 2010

(51) Int. Cl.
*G06F 17/30* (2006.01)
(52) U.S. Cl. .................................. 707/737; 707/749
(58) Field of Classification Search ........... 707/736–752
See application file for complete search history.

(56) References Cited

U.S. PATENT DOCUMENTS

| | | | |
|---|---|---|---|
| 6,581,058 B1* | 6/2003 | Fayyad et al. ................. | 707/737 |
| 2002/0145757 A1* | 10/2002 | Fedorovskaya et al. ....... | 358/3.1 |
| 2003/0210816 A1* | 11/2003 | Comaniciu et al. ........... | 382/171 |
| 2004/0010497 A1* | 1/2004 | Bradley et al. ................ | 707/100 |
| 2004/0139067 A1* | 7/2004 | Houle .............................. | 707/3 |
| 2005/0114382 A1* | 5/2005 | Lakshminarayan et al. .. | 707/102 |
| 2006/0282236 A1* | 12/2006 | Wistmuller ...................... | 703/2 |
| 2007/0288185 A1* | 12/2007 | Burch et al. .................... | 702/81 |
| 2008/0077570 A1* | 3/2008 | Tang et al. ....................... | 707/5 |

OTHER PUBLICATIONS

D'Agostino, Ralph B. et al., "Cluster Analysis, Variables", Encyclopedia of Biostatistics, vol. 1, pp. 731-739 [Feb. 1998].
Fruhwirth-Schnatter, Sylvia et al., "Model-based Clustering of Multiple Time Series", pp. 1-28 [Jun. 28, 2004].
Lee, Taiyeong et al., "Two-Stage Variable Clustering for Large Data Sets", SAS Global Forum 2008, Paper 320-2008, pp. 1-14.
Rodrigues, Pedro Pereira et al., "Hierarchical Clustering of Time Series Data Streams", IEEE Transactions on Knowledge and Data Engineering, vol. 20, No. 5, pp. 615-627 [May 2008].
Sanche, Robert et al., "Variable Reduction for Predictive Modeling with Clustering", Casualty Actuarial Society Forum, Winter 2006, pp. 89-100.
SAS/STAT 9.2 User's Guide, Chapter 93 The VARCLUS Procedure, pp. 7449-7480 [2008].

* cited by examiner

*Primary Examiner* — Wilson Lee
(74) *Attorney, Agent, or Firm* — Jones Day

(57) ABSTRACT

Computer-implemented systems and methods are provided for creating a cluster structure from a data set containing input variables. Global clusters are created within a first stage, by computing a similarity matrix from the data set. A global cluster structure and sub-cluster structure are created within a second stage, where the global cluster structure and the sub-cluster structure are created using a latent variable clustering technique and the cluster structure output is generated by combining the created global cluster structure and the created sub-cluster structure.

15 Claims, 14 Drawing Sheets

GLOBAL CLUSTER PLOT - NODE DATA

| NAME OF VARIABLE OR CLUSTER | NODE TYPE | FREQUENCY COUNT | PERCENT OF TOTAL FREQUENCY |
|---|---|---|---|
| GC1 | GCLUSTER | 99 | 16.04538 |
| GC2 | GCLUSTER | 59 | 9.562399 |
| GC3 | GCLUSTER | 133 | 21.55592 |
| GC4 | GCLUSTER | 137 | 22.20421 |
| GC5 | GCLUSTER | 77 | 12.47974 |
| GC6 | GCLUSTER | 64 | 10.37277 |
| GC7 | GCLUSTER | 48 | 7.779579 |

Fig. 5

| EMWS8.VARCLUS2_GSCORE | GC1 | GC2 | GC3 | GC4 | GC5 | GC6 | GC7 |
|---|---|---|---|---|---|---|---|
| 1 | -0.256093713 | -0.23271517 | 1.1587623487 | 0.1947209542 | -0.285714597 | -1.460175065 | -0.9069572 |
| 2 | 0.2307475486 | -0.295586441 | 1.1831245837 | -0.034490458 | 0.1654506949 | -0.959408032 | -0.407690794 |
| 3 | -1.373134404 | -0.233463489 | 1.3722192426 | -0.141731254 | 0.4653585568 | -1.430384005 | -2.169946051 |
| 4 | -1.180515379 | -0.507848909 | 1.3902789774 | -0.569644063 | 0.2463745077 | -1.456748532 | -2.223997271 |
| 5 | -1.1123539 | -0.307294266 | 1.2440490005 | 1.5843143853 | -2.424942651 | -1.796119604 | -0.997218125 |
| 6 | -1.208069366 | -0.472381169 | 1.2152263074 | 1.4468594157 | -2.963822368 | -1.807404136 | -1.513799012 |

*Fig. 6A*

| 6230 | 1.35650414 | -0.168041547 | -1.254348772 | -0.597313263 | -0.331816215 | -0.316647997 | -2.361198994 |
|---|---|---|---|---|---|---|---|
| 6231 | 0.8316991967 | 3.4877481203 | 0.3373964006 | -1.695023036 | 1.1629402023 | 1.6516120022 | 1.331293671 |
| 6232 | -1.313027132 | 0.0232656067 | 1.0091747195 | 0.7015559741 | 0.4899822899 | -0.685479983 | 0.387039748 |
| 6233 | -0.753676609 | -0.654393612 | -0.480145245 | 0.5105178575 | 0.7159580589 | -0.574779617 | 0.198550431 |
| 6234 | -1.199201989 | -0.110793908 | 0.9910754037 | 0.7440322719 | -1.249510591 | -0.325972339 | 0.3203200308 |
| 6235 | 0.1764751563 | -0.438663174 | -0.372911128 | -0.148433344 | 0.462868857 | 0.697642877 | 0.4237842811 |
| 6236 | 0.6371209568 | 2.4217046714 | 0.2626086853 | -0.747534774 | 0.1639624043 | 1.7568733437 | 1.212765154 |
| 6237 | 0.3619376821 | -0.463351575 | -0.29125082 | -0.646943281 | -1.719498461 | -0.493021773 | -1.995011921 |
| 6238 | -1.219482255 | -0.332990996 | 1.0577324606 | 1.4329177649 | -0.576010253 | -0.767479715 | 0.1205835348 |

*Fig. 6B*

| Role | Measurement Level | Frequency Count |
|---|---|---|
| ID | NOMINAL | 2 |
| INPUT | INTERVAL | 43 |
| INPUT | NOMINAL | 4 |
| TARGET | BINARY | 1 |

Variable Summary before Variable Clustering

Fig. 12A

| Role | Measurement Level | Frequency Count |
|---|---|---|
| INPUT | INTERVAL | 11 |
| INPUT | NOMINAL | 4 |
| TARGET | BINARY | 1 |

Variable Summary after Variable Clustering

Fig. 12B

| Name | Use | Report | Role | Level △ |
|---|---|---|---|---|
| PURCHASE | Yes | No | Target | Binary |
| Clus9 | Default | No | Input | Interval |
| Clus10 | Default | No | Input | Interval |
| Clus4 | Default | No | Input | Interval |
| Clus7 | Default | No | Input | Interval |
| Clus2 | Default | No | Input | Interval |
| Clus8 | Default | No | Input | Interval |
| Clus6 | Default | No | Input | Interval |
| Clus3 | Default | No | Input | Interval |
| Clus1 | Default | No | Input | Interval |
| Clus11 | Default | No | Input | Interval |
| Clus5 | Default | No | Input | Interval |
| NTITLE | Default | No | Input | Nominal |
| GENDER | Default | No | Input | Nominal |
| APRTMNT | Default | No | Input | Nominal |
| TELIND | Default | No | Input | Nominal |

Input Variables in Regression after Variable Clustering

*Fig. 13*

☐ Selected Variables

| Cluster | Variable | Label | R-Square With Own Cluster Component | Next Closest Cluster | R-Square With Next Cluster Component | Type | 1-R2 Ratio | Variable Selected |
|---|---|---|---|---|---|---|---|---|
| CLUS1 | COATS | Coats Purch. | 0.605311 | CLUS4 | 0.123064 | Variable | 0.450078 | Yes |
| CLUS10 | MOBILE | Occupied <... | 1 | CLUS4 | 0.007341 | Variable | 0 | Yes |
| CLUS11 | HEAT | | 1 | CLUS9 | 0.007357 | Variable | 0 | Yes |
| CLUS2 | AMOUNT | Dollars Spe... | 0.802815 | CLUS1 | 0.129797 | Variable | 0.226596 | Yes |
| CLUS3 | INCOME | Yearly Inco... | 0.758896 | CLUS9 | 0.2329 | Variable | 0.314306 | Yes |
| CLUS4 | LINENS | Linens Pur... | 0.577627 | CLUS1 | 0.218948 | Variable | 0.540774 | Yes |
| CLUS5 | PROMO13 | Promo: 8-1... | 0.90716 | CLUS4 | 0.203347 | Variable | 0.116537 | Yes |
| CLUS6 | SNGLMOM | Single Mom | 0.585795 | CLUS10 | 0.002436 | Variable | 0.415217 | Yes |
| CLUS7 | JOB | | 0.562369 | CLUS8 | 0.019317 | Variable | 0.446251 | Yes |
| CLUS8 | ORIGIN | | 0.614597 | CLUS7 | 0.079692 | Variable | 0.418775 | Yes |
| CLUS9 | COUNTY | County Code | 0.554541 | CLUS10 | 0.00496 | Variable | 0.447679 | Yes |

Fig. 14

| Variable Selected | Cluster | Variable | Label | 1-R2 Ratio | R-Square With Own Cluster Component |
|---|---|---|---|---|---|
| YES | CLUS6 | CLUS6 | Cluster 6 | 0.0 | 1.0 |
| NO | CLUS6 | PROMO7 | Promo: 1-7 mon. | 0.11470876277845 | 0.9025902286096 |
| NO | CLUS6 | PROMO13 | Promo: 8-13 mon | 0.11835090750020 | 0.9061726695878 |
| YES | CLUS6 | NUMKIDS | | 0.98605215645928 | 0.019981921518 |

SAS Table Editor - WORK.OUTRSQUARE
Cluster: CLUS6

COMPUTER-IMPLEMENTED SYSTEMS AND METHODS FOR VARIABLE CLUSTERING IN LARGE DATA SETS

TECHNICAL FIELD

The technology described herein relates generally to systems and methods for clustering data. More specifically, the technology described herein relates to two-stage clustering of large data sets.

BACKGROUND

In data mining, principal component analysis is a popular dimension reduction technique. It also provides a good remedy for the multicollinearity problem, but its interpretation of input space is not as good. To overcome the interpretation problem, principal components (cluster components) are obtained through variable clustering. The procedure uses oblique principal components analysis and binary iterative splits for variable clustering, and it provides non-orthogonal principal components. Even if this procedure sacrifices the orthogonal property among principal components, it provides good interpretable principal components and well-explained cluster structures of variables. However, such an implementation is inefficient when dealing with high-dimensional data.

Clustering is a popular data mining technique. Most clustering implementations focus on clustering of observations. However, similar clustering algorithms can be applied to the variable domain to reduce the dimension of input space. There are two typical approaches to variable clustering. The first is to apply common clustering techniques to any distance matrix of the variables. The second is to use variable structure from factor analysis or principal components analysis. The performance of the former approach depends largely on the type of clustering algorithm that is used. The latter approach is a more expensive process because it requires eigenvalue decomposition and a certain iterative optimization process such as factor rotation. The variable structure method, though, also tends to give better results more often than the common clustering technique method. One of the variable structure methods is used with PROC VARCLUS in SAS/STAT® software available from SAS Institute Inc. This method provides an iterative variable clustering that uses oblique rotation of principal components. The procedure generates variable cluster structures, identifies key variables within each cluster, and also provides non-orthogonal principal components that are called cluster components. The cluster components give much better interpretation than regular principal components because they consist of only the variables in each cluster. PROC VARCLUS has been used by Cerrito, et al. (1999), Sanche and Lonergan (2006), and Nelson (2001). Also, D'Agostino and Russell (2005) show several variants of variable-clustering methods using latent variables that include the PROC VARCLUS algorithm.

Still, none of the listed papers address large data sets for variable clustering, and no benchmarking for large data sets were reported. Benchmark testing based on the PROC VARCLUS algorithm shows that the approach does not scale well. Because the procedure requires significant calculation resources for very large data sets with, for example, more than 3,000 variables, it is inappropriate for data mining tasks.

SUMMARY

In accordance with the teachings herein, computer-implemented systems and methods are provided for two-stage variable clustering for large data sets, including global clusters, sub-clusters, and their principal components.

For example, a computer-implemented system and method can be configured to create global clusters within a first stage, by computing a similarity matrix from the data set. A global cluster structure and sub-cluster structure are created within a second stage, where the global cluster structure and the sub-cluster structure are created using a latent variable clustering technique and the cluster structure output is generated by combining the created global cluster structure and the created sub-cluster structure.

The system and method can include the formed cluster structure containing a number of variables that is less than the number of variables in the data set. The variables in the data set are independent variables for predicting a target within a prediction model, and the reduced number of variables in the formed cluster structure also are independent variables for predicting the target within the prediction model.

BRIEF DESCRIPTION OF DRAWINGS

FIGS. 5-9 are example user interfaces for displaying data generated by an example two-stage variable clustering system.

FIGS. 12-15 is an example user interface displaying data regarding the operation of an example two-stage variable clustering module within a larger analytical framework.

FIG. 16 a block diagram depicting a single general-purpose computer environment wherein a user can interact with a two-stage variable clustering system.

DETAILED DESCRIPTION

Figure 1:
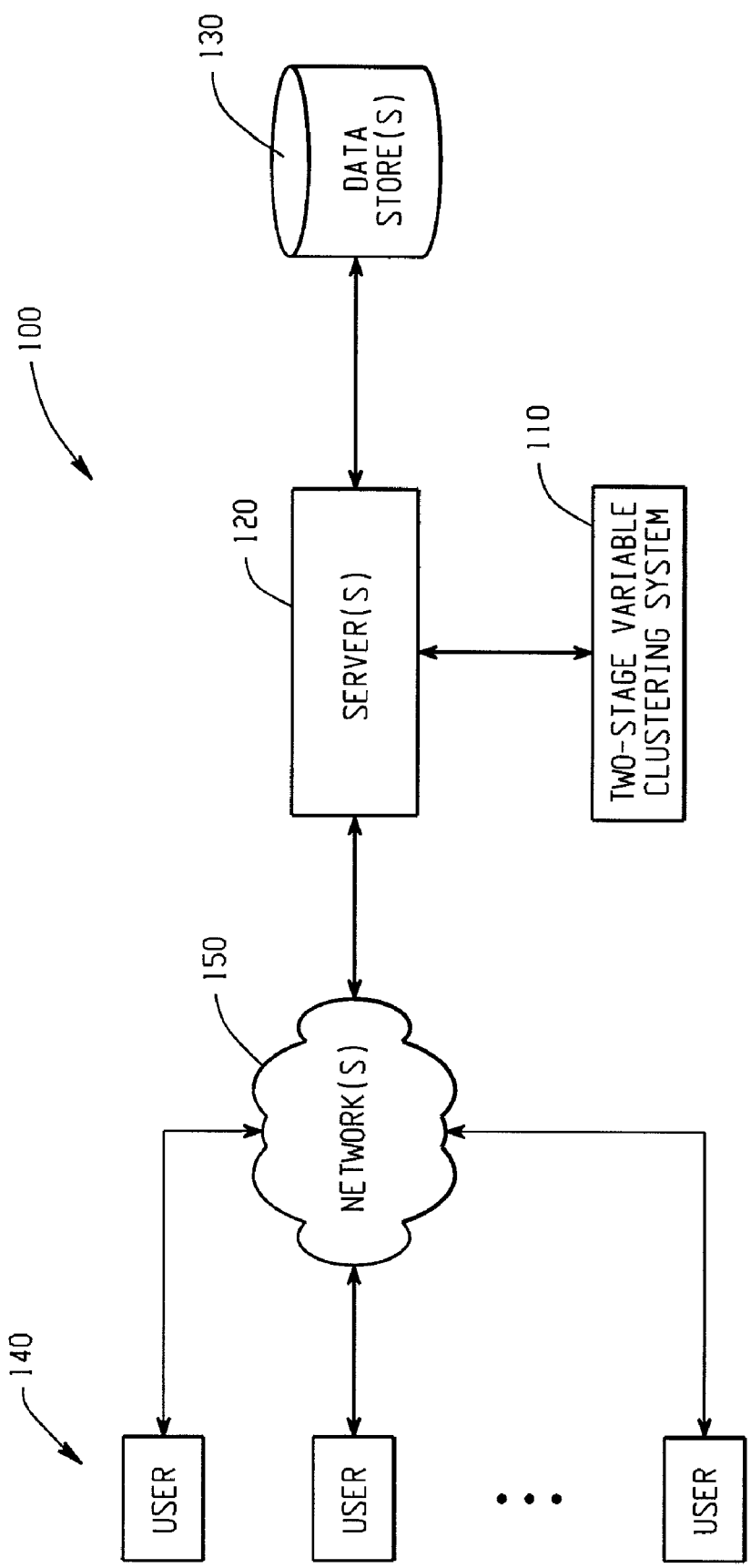
FIG. 1 is a block diagram depicting an environment in which users can interact with a two-stage variable clustering system.

FIG. 1 depicts at 100 an environment in which one or more users can interact with an example two-stage variable clustering system 110. The example two-stage variable clustering system 110 may be used to reduce the size of an input data set, and the reduced data set thus produced then could be used as the input for one or more further analytical processes.

The example two-stage variable clustering system 110 may be executed on one or more servers 120. The one or more servers 120, in turn, may be connected to one or more data stores 130, which may store the input, output, or both of the example two-stage variable clustering system 110. Users 140 may access the example two-stage variable clustering system 110 over one or more networks 150 that are linked to the one or more servers 120 on which the example two-stage variable clustering system 110 executes.

Figure 2:
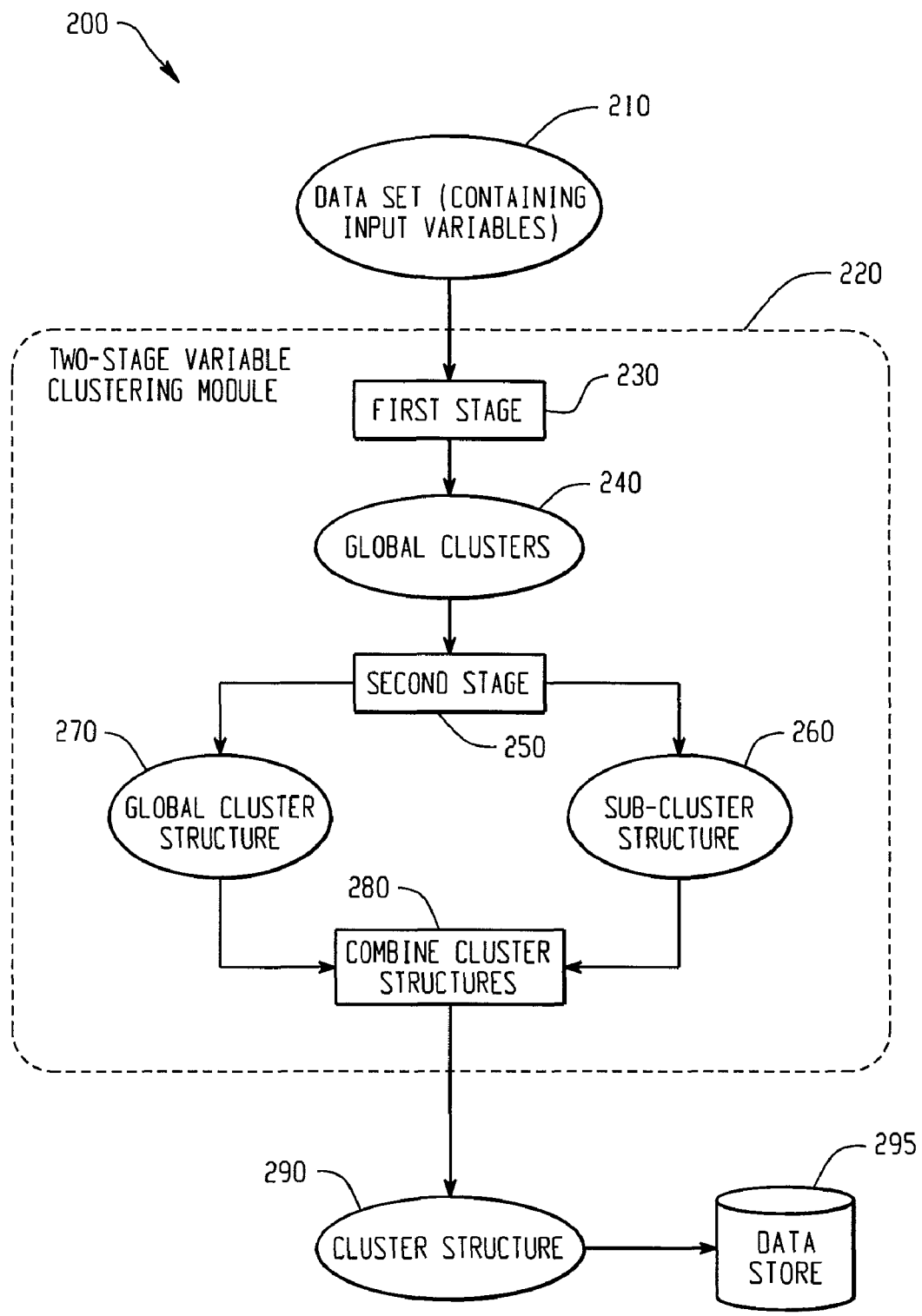
FIG. 2 is a block diagram depicting elements of an example two-stage variable clustering system.

FIG. 2 depicts at 200 an example two-stage variable clustering system. A data set 210, which includes input variables, is input to a two-stage variable clustering module 220. The two-stage variable clustering module 220 operates to reduce the input data set 210. The first stage 230 of the two-stage variable clustering module 220 generates global clusters 240 from the input data set 210. This may be done, for example, by calculating a similarity matrix for the input variables in the data set 210. Once such a similarity matrix is calculated, a clustering algorithm is applied to the similarity matrix, and the results of the application of the clustering algorithm are divided into a predefined number of clusters, each of which is a homogeneous group. As a general rule, the number of clusters usually does not exceed the integer value of (# of variables/100)+2. As an alternative to use of a predefined number of clusters, a criterion such as a Cubic Clustering Criterion (CCC) may be used to determine a number of clusters.

The global clusters 240 generated in the first stage 230 are input to a second stage 250 of the two-stage variable clustering module 220. The second stage 250 generates a sub-cluster structure 260 for each of the global clusters 240 that were input. The second stage 250 also generates a structure 270 for the global clusters generated in the first stage 230. To generate the sub-cluster structures 260, each global cluster generated in the first stage is treated as the entire input for a latent variable technique. This technique is repeated for each of the global clusters generated in the first stage. One or more sub-clusters may make up a particular global cluster.

The second stage 250 also generates a global cluster structure 270 using the components of the global clusters 240 generated in the first stage 230. Thus, for example, the second stage 250 could select the first principal component of the variables in each of the global clusters 240 (i.e., the principal component from each cluster that accounts for the greatest variance in the variables within the cluster) and use the selected first principal components to generate the global cluster structure 270. In another example, the unweighted mean average of all of the variables within one of the global clusters 240 could be used as the component for a particular global cluster, instead of using the first principal component of the global cluster. The global cluster components behave like input variables. Thus, a clustering technique, such as a latent variable technique, may be applied to the global cluster components, where each of the global cluster components would represent its corresponding global cluster in the analysis. Applying a clustering technique in this way may be used to generate a global cluster structure, such as the example global cluster structure 270.

Once the sub-cluster structures 260 for each of the global clusters 240 and the global cluster structure 270 have been created, the structures are combined at 280 to produce a cluster structure 290. In this way, a multi-level hierarchy can be created to represent the input variables contained in data set 210. This is similar to a multi-level hierarchy that could have been created had a user applied the chosen latent variable analysis to the entire data set 210 without employing a two-stage clustering technique. When the cluster structure 290 is generated, it provides a functional map of the interrelationships among the input variables in the data set 210.

The cluster structure 290 can be identical to the output that would have resulted had the chosen latent variable technique been applied to the overall input data set 210. Even if slight differences were to exist, though, between the cluster structure 290 and the hypothetical output of the full latent variable method, the increased efficiency of the two-stage module could outweigh small changes in analytical sensitivity. Once the combination 280 has produced cluster structure 290, the cluster structure 290 is output by the two-stage variable clustering module 220. The cluster structure 290 may, for example, be output to a data store 295 for storage.

Figure 3:
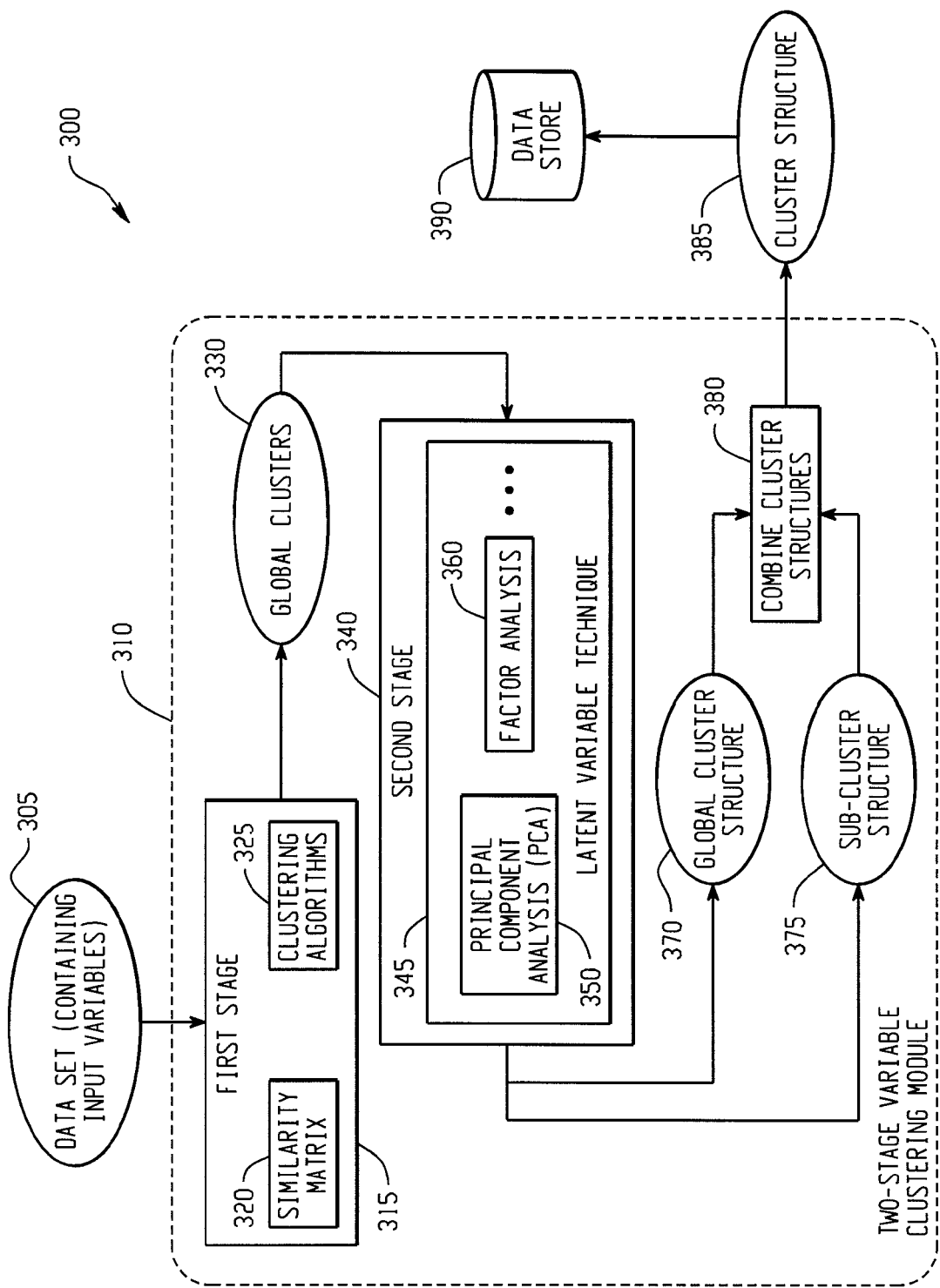
FIG. 3 is a block diagram depicting elements of an example two-stage variable clustering system.

FIG. 3 depicts at 300 an example two-stage variable clustering system. The data set 305, which contains input variables, is input to the two-stage variable clustering module 310. In the first stage 315 of the clustering module 310, a clustering technique is applied. As discussed above, a similarity matrix 320 is calculated for the input data set 305. One example of a similarity matrix that could be calculated is a correlation matrix. Once such a similarity matrix is calculated, a clustering algorithm 325 is applied to the similarity matrix, and the results of the application of the clustering algorithm 325 are divided into a predefined number of clusters, each of which is a homogeneous group.

The global clusters 330 are input to the second stage 340 of the clustering module 310. In the second stage 340, latent variable techniques 345 are applied to the global clusters to generate a global cluster structure and sub-cluster structures for each of the global clusters. Examples of the latent variable techniques 345 that could be applied in the second stage 340 include principal component analysis (PCA) 350 and factor analysis 360.

As brief background regarding PCA, PCA is a decomposition technique that produces a set of expression patterns known as principal components. Principal components are uncorrelated linear combinations of the original input variables (such as disparity indices) and can be computed as:

$$Y = X * W$$

Where Y is the n-by-p matrix of principal components; X is the n-by-p matrix of centered data; and W is the p-by-p matrix of weights, obtained from an eigenvector-eigenvalue decomposition of the covariance matrix of the data. There are p principal components, and each is a linear combination of the observed variables. The principal components are all mutually orthogonal. The first principal component is the linear combination of the observed variables with maximum variance. The second principal component is the linear combination of the observed variables, out of all linear combinations orthogonal to the first, with maximum variance, and so on. Given the decreasing variance property, much of the variance (information) in the original set of p variables tends to concentrate in the first few principal components. Therefore variance for the p variables concealed in the original data set can reveal itself on the first few principal components, because principal components can provide maximum separation between the classes or groups with substantial indices. This feature enables the detection of observations with extreme values (outliers) in a space defined by 1, 2, or 3 principal components.

In the example where PCA 350 is used as the latent variable technique, the global cluster structure 370 is generated using the global cluster components, which are the first principal components of the variables in each of the input global clusters 330. The global cluster components are analyzed using PCA 350, and the result is a structure of the global clusters 330. The second stage 340 also generates a sub-cluster structure for each of the global clusters 330. Here, the variables of one global cluster are treated as the input set and a latent variable technique 345 is applied. The technique 345 applied may be the same as was used to generate the global cluster structure 370, but any other latent variable technique may be used instead.

Once the global cluster structure 370 and the sub-cluster structures 375 are generated, they are combined at 380. The resulting cluster structure 385 is output from the clustering module 310. The output cluster structure 385 then may be stored in a data store 390 for subsequent use. For example, the cluster structure 385 may be used to develop a predictive model for a particular application, such as for use in a speech-recognition application to predict words based upon input speech. As another example, a predictive model can be used to predict how likely a particular customer (i.e., the target variable) is to purchase a product or service based upon such variables as the number of children in the household, household income, etc.

Figure 4:
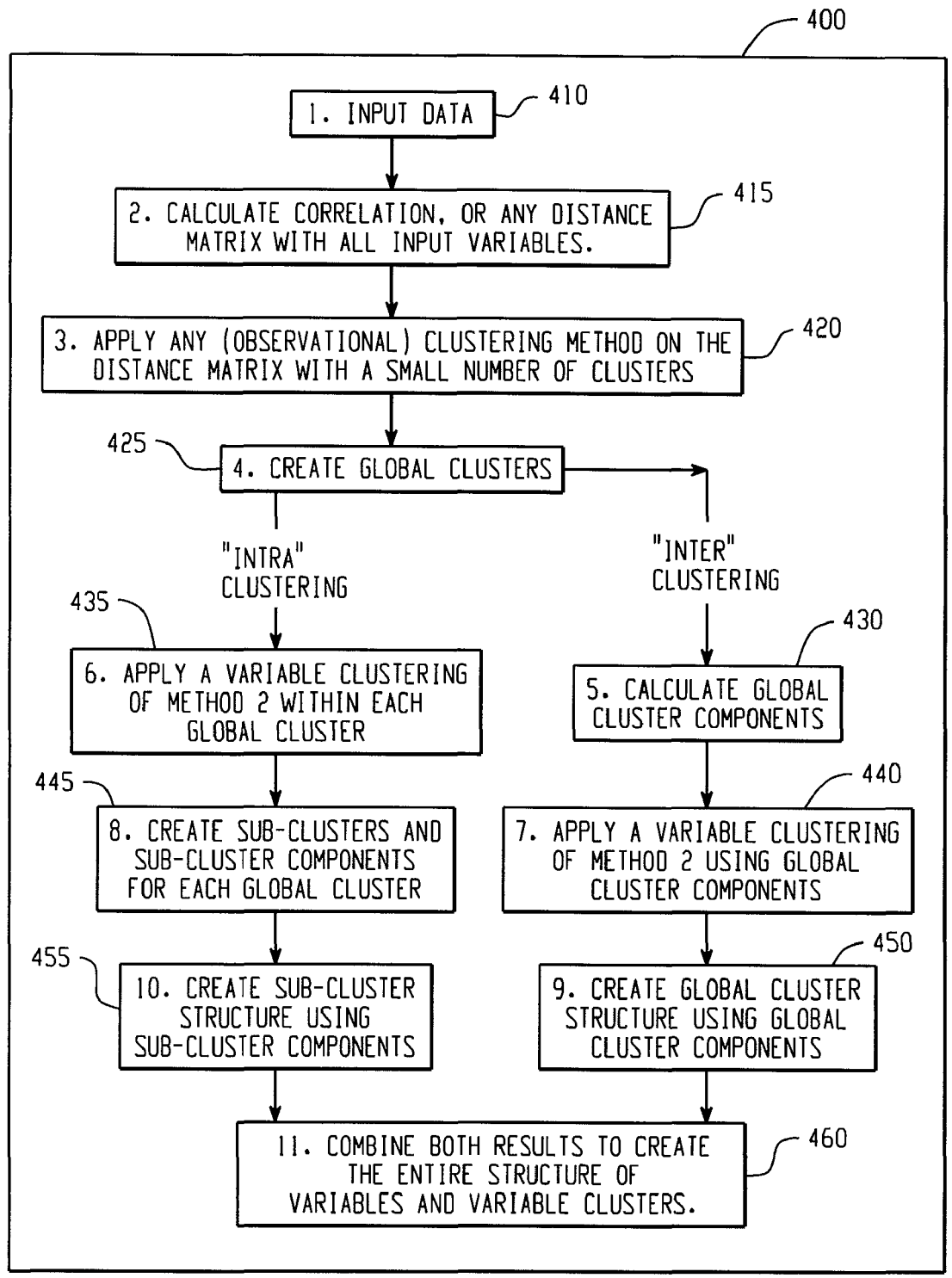
FIG. 4 is a flow diagram depicting an operational scenario of an example two-stage variable clustering system.

FIG. 4 depicts at 400 a flow diagram illustrating an operational scenario of an example two-stage variable clustering system. The input data 410 is a collection of input variables for a modeling problem. At 415, the example clustering system calculates a correlation matrix, or any similarity matrix, covering the entire set of input 410. At 420, the example system applies a chosen clustering method to the similarity matrix calculated at 415. The clustering method applied at 420 produces a fixed number of clusters, as shown at 425. The number of clusters to be generated at 425 may be pre-set within the example system, or a criterion, such as CCC, could be used to determine an appropriate number of clusters at runtime. This corresponds to the operation of the first stage, as described above.

Once the global clusters have been generated at 425, the second stage bifurcates. At 430, the example system calculates global cluster components for the global clusters. This line of operations within the second stage could also be referred to as "inter-clustering." The other operations undertaken within the second stage using the input global clusters is the application of a latent variable technique to each set of variables that makes up a global cluster, as depicted at 435. This line of operations could also be referred to as "intra-clustering." As shown in the flow diagram, the operations of the "inter-clustering" and the "intra-clustering" may take place in parallel, but this is not necessary for proper functioning of the example system.

In the "inter-clustering" branch, at 440, the example system applies a latent variable technique to the global cluster components calculated at 430. Once the global cluster components have been generated using the latent variable technique, the example system proceeds at 450 to create a global cluster structure. The global cluster structure thus created is combined with the output of the "intra-clustering" branch of the second stage of the example system.

In the "intra-clustering" branch, as shown at 445, application of the latent variable technique to the variables in a global cluster results in the determination of sub-clusters within the global cluster, and sub-cluster components further are determined for the sub-clusters, similar to the determination of global cluster components in the "inter-clustering" branch. At 455, a sub-cluster structure is generated for each global cluster using the sub-cluster components derived at 445. The steps 435, 445, and 455 are repeated for each global cluster created at 425. At 460, the sub-cluster structures thus generated are combined with the global cluster structure created at 450. The result is a cluster structure for the full set of input data 410.

FIG. 5 depicts an example user interface that may be used to display to a user of a two-stage variable clustering system data about the operation of the clustering system. The user interface displays information about seven global clusters generated by the clustering system, for example at step 425 in FIG. 4. At 500, the first row of the table displays information regarding the first global cluster (GC1). Cluster GC1 contains 99 variables from the input data set, as shown in column 510 labeled Frequency Count. Further, as shown at column 520, labeled Percent of Total Frequency, the 99 variables in cluster GC1 represent approximately 16% of the variables in the input data set.

FIGS. 6A and 6B depict example user interfaces that may be used to display additional information about the operation of the clustering system to a user of the system. Based on the global clusters created at step 425 in FIG. 4, global cluster components for each of the global clusters are calculated using the first principal component of variables in each global cluster, as shown at step 430 in FIG. 4. In other example two-state variable clustering systems, other types of components could be used instead of the first principal component. FIGS. 6A and 6B are truncated views showing the first principal component for each of the seven global clusters generated for the example input data set.

Figures 7, 8:
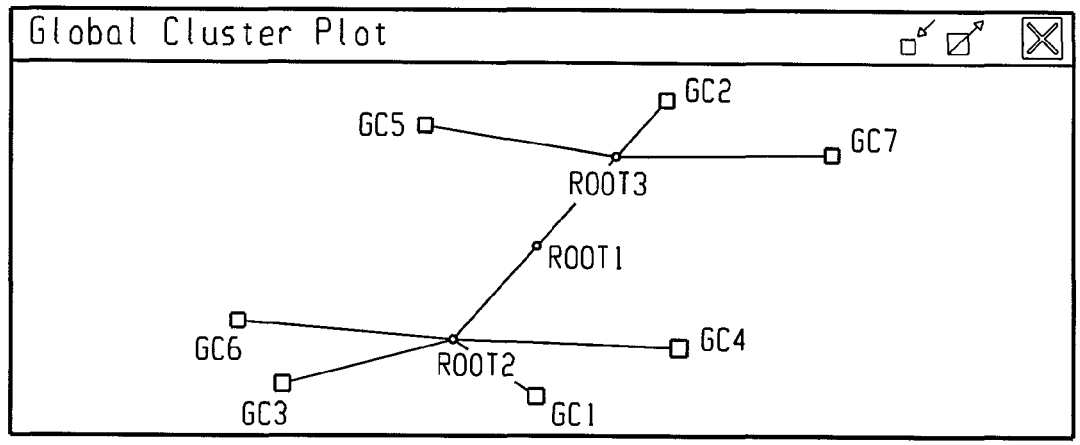

FIG. 7 is another example user interface that may be used to display further information about the operation of an example two-stage variable clustering system. The user interface displays a graphical representation of the global cluster structure. The global cluster structure is generated, for example, at steps 440 and 450 in FIG. 4. Using the information shown in the tables of FIGS. 6A and 6B, a latent variable technique is applied to determine the relationships among the seven global clusters generated for the example input data set. The graphical display, then, is a visual depiction of the structured relationships among the seven example global clusters. The three root nodes depicted in the graphical representation are not themselves representative of data from the input data set. They are used only to illustrate the relationships among the global clusters.

As discussed above, the example two-stage variable clustering system also undertakes an "intra-clustering" branch of operation, as shown at steps 435, 445, and 455 of FIG. 4. FIG. 8 is an example user interface that may be used to display information about the "intra-clustering" branch of the example system to a user of the system. At steps 435 and 445 in FIG. 4, application of a latent variable technique to the subset of input data contained in a single global cluster results in generation of sub-clusters for that global cluster. The user interface depicted in FIG. 8 displays information about the sub-clusters generated at steps 435 and 445 to a user. Column 800, labeled GCLUSTER, displays the identity of the global cluster to which the latent variable technique was applied. In the example user interface, this is cluster GC1. In the example input data set, eleven sub-clusters are generated within cluster GC1. Column 810, labeled CLUSTER, shows an identifier assigned to each of the generated sub-clusters. Columns 820 and 830 are analogous to columns 510 and 520 in FIG. 5, except that column 820 displays information about the number of variables within each sub-cluster. Column 830 displays the share of variables each sub-cluster contains as a percentage of the overall input data set. Another example user interface might instead display the percentage of variables the sub-cluster contained of the sub-set represented by the specified global cluster.

Figure 9:
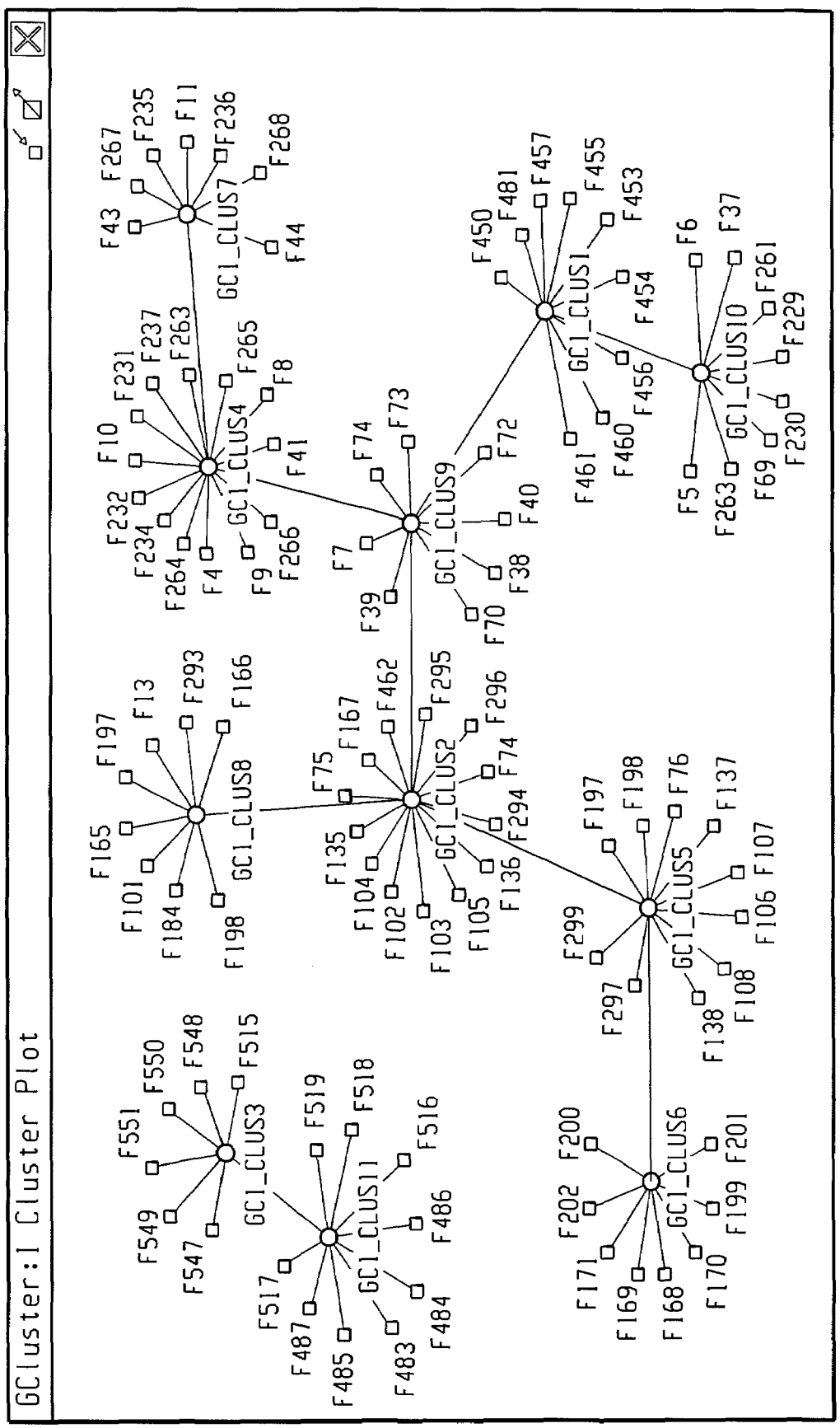

FIG. 9 is an example user interface that may be used to display a graphical depiction of the sub-cluster structure for the sub-clusters of a given global cluster. The nodes of the graphical depiction are examples of the sub-clusters generated at steps 435 and 445 in FIG. 4 and the variables contained in each particular sub-cluster. Once the sub-clusters and sub-cluster components have been generated, the sub-cluster structure may be generated, as shown at step 455 in FIG. 4. As with the example user interface for displaying the global cluster structure, this example user interface depicts graphically the calculated relationships among the sub-clusters for global cluster GC1.

Figure 10:
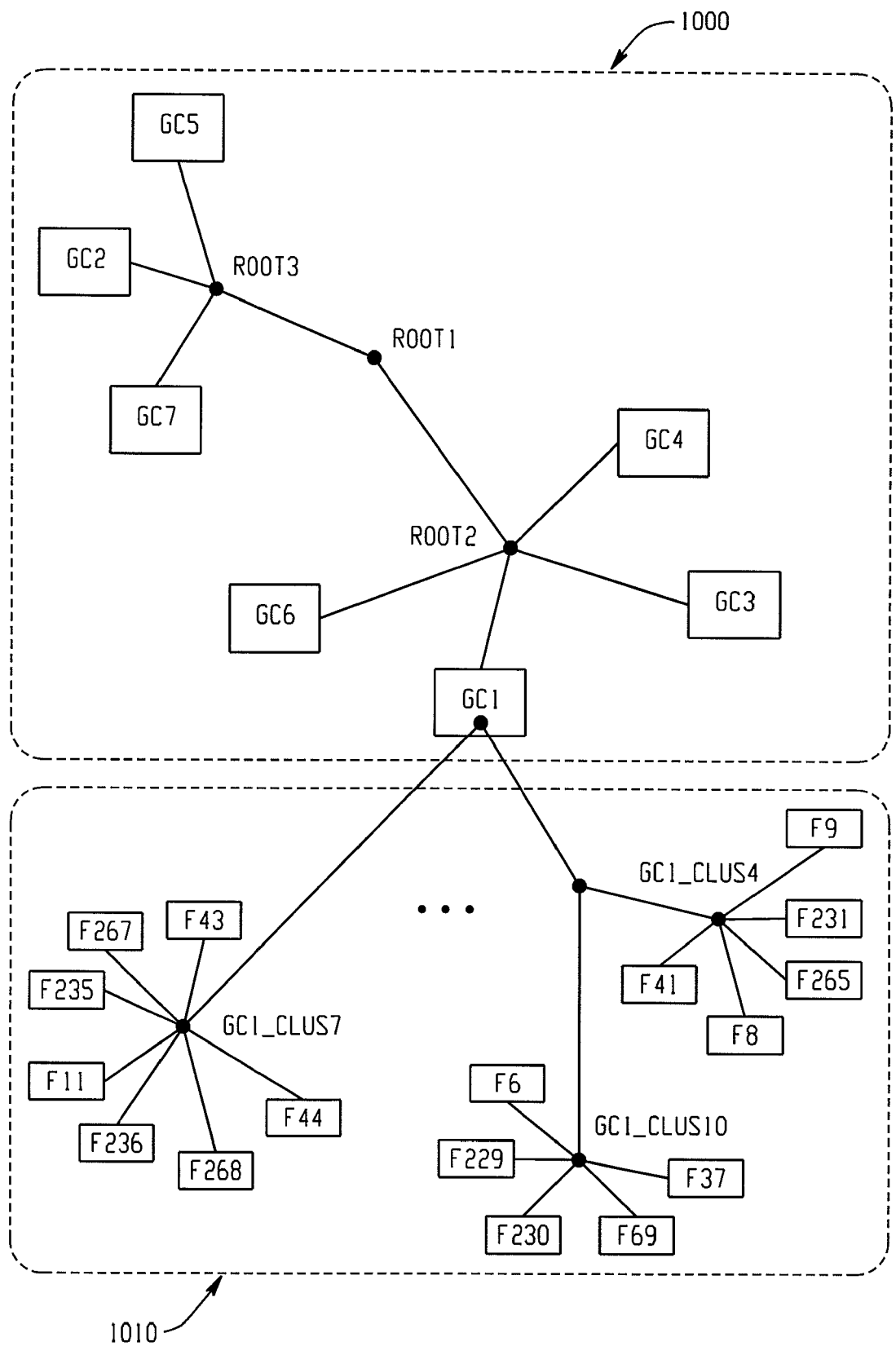
FIG. 10 is a block diagram depicting an example cluster structure generated by the combination of a global cluster structure and a sub-cluster structure.

FIG. 10 depicts a partial cluster structure that could be generated by an example two-stage clustering module. The global cluster structure 1000 is similar to the global cluster structure depicted in FIG. 7. The application of a latent variable technique to the global cluster components, as described above, produces a functional map of interrelationships among the global clusters generated in the first stage of the two-stage clustering module. This functional map may be depicted graphically, with the inclusion of root nodes to identify how the global clusters themselves are clustered.

The second stage of the two-stage module also generates a sub-cluster structure for the variables represented in each of the global clusters generated in the first stage of the two-stage module. An example of a partial sub-cluster structure is shown at 1010. This sub-cluster structure is similar to the sub-cluster structure depicted in FIG. 9, but for illustrative purposes, the sub-cluster structure depiction 1010 contains only a partial representation of an example sub-cluster structure for the global cluster GC1. Further, the interrelationships among the sub-clusters are altered to illustrate further that a hierarchical structure for an input data set may contain multiple levels. Thus, for example, the sub-cluster GC1_CLUS7 is represented at a different level than the sub-clusters GC1_CLUS4 and GC1_CLUS10. In the example, the different levels for the sub-clusters may be indicative that the relationship between GC1_CLUS4 and GC1_CLUS10 differs somewhat from the relationship between GC1_CLUS7 and either GC1_CLUS4 or GC1_CLUS10, even though all three sub-clusters include variables that are a part of a single global cluster. The inclusion of multiple levels in such a functional hierarchy may allow for additional benefits, such as a greater reduction in the size of an input data set or for faster execution of the chosen clustering technique.

Figure 11:
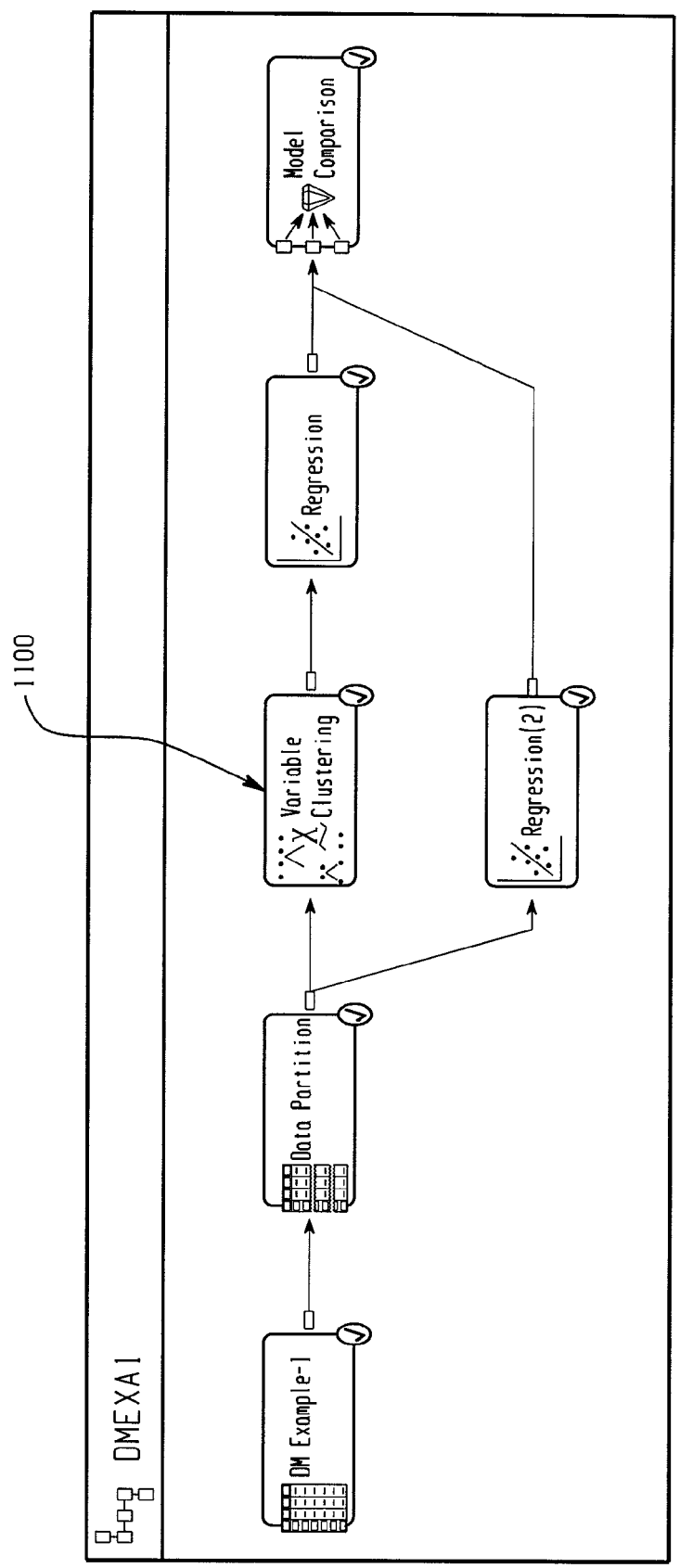
FIG. 11 is an example user interface for a system incorporating two-stage variable clustering into a larger analytical framework.

FIG. 11 shows an example user interface depicting how a two-stage variable clustering module might be incorporated into a larger analytical framework. At 1100, the user interface includes a "Variable Clustering" module, which may incorporate the systems and methods described herein. In the example, the Variable Clustering module has been incorporated into a large data modeling framework. As described above, the Variable Clustering module may be useful within such a framework as a way of reducing the size of the input variable space, thus allowing the larger modeling process to execute more quickly while still producing useful results.

Using the Variable Clustering module within a larger analytical framework, such as SAS/Enterprise Miner 5.3 (EM53), available from SAS Institute Inc., a user could, for example, make two types of predictive models: a latent variable predictive model with cluster components, and a predictive model with selected best variables. The user also could combine the two for predictive modeling. Generally, the variable clustering node produces cluster components that are the first principal components from each cluster. The cluster components sacrifice the orthogonal property, but increase the interpretability of input space. The following example explains how a user might use variable clustering for predictive models.

Once the user obtains clusters (or sub-clusters) from the two-stage variable clustering module, the use cases of them for predictive models are similar to those of clusters that would have resulted had a single latent variable technique simply been applied to the entire input data set. So, the predictive model example below is shown as though the user had employed such a method, which is referred to as the "single-stage method." First, it is useful to illustrate how a user might create cluster components as new input variables for predictive models. There are different ways to do this, such as using Centroid Components and Principal Components. Suppose the user has 10 variables labeled x1, x2, . . . , x10, which are classified into two clusters (x1, x2, x3, x4, x5, x6) and (x7, x8, x9, x10).

Centroid method: using simple average of all variables in the cluster $$\text{Cluster Component } 1 = (\tfrac{1}{6})^* x1 + (\tfrac{1}{6})^* x2 + (\tfrac{1}{6})^* x3 + (\tfrac{1}{6})^* x4 + (\tfrac{1}{6})^* x5 + (\tfrac{1}{6})^* x6$$

$$\text{Cluster Component } 2 = (\tfrac{1}{4})^* x7 + (\tfrac{1}{4})^* x8 + (\tfrac{1}{4})^* x9 + (\tfrac{1}{4})^* x10.$$

Principal Component method: using the first principal component from each cluster $$\text{Cluster Component } 1 = a1^* x1 + a2^* x2 + a3^* x3 + a4^* x4 + a5^* x5 + a6^* x6$$

$$\text{Cluster Component } 2 = c1^* x7 + c2^* x8 + c3^* x9 + c4^* x10$$

where:
a1-a6 are coefficients of the first principal component from cluster 1, and
c1-c4 are coefficients of the first principal component from cluster 2.

FIGS. 12A and 12B are further example user interfaces that show how a two-stage variable clustering system may operate to improve the performance of a larger analytical framework. FIG. 12A displays information regarding the overall input data set, while FIG. 12B displays information regarding the input data set after application of the two-stage variable clustering method. In the example, the variable clustering node creates 11 cluster components (labeled CLUS 1-CLUS 11) from 43 interval variables, representing a dimension reduction factor of approximately one-fourth. In the example, because class variables are not included at the variable clustering, they are passed to the regression node without any changes, as shown in the example user interface depicted in FIG. 13. A user could include class variables in the variable clustering process, but interpretation may be required because dummy variables from one class variable could be clustered into different categories.

In another example of the operation of a two-stage clustering technique, application of the technique to the Isolated Letter Speech Recognition (ISOLET) data set produced significant performance gains in clustering of the test data. The ISOLET data includes 617 attribute variables plus one target variable. In this example, execution times for clustering test data derived from the ISOLET data set via the two-stage clustering technique were superior to execution times for variable clustering without the two-stage technique. Further, the performance improvement for the example data set was geometric as the number of variables was increased (using multiples of the 617 attribute variables from the data set).

FIG. 14 depicts at 1400 a user interface showing another way in which the variable clustering module could be used for dimension reduction—a variable selection tool. The user interface lists each cluster for a given input set, as shown at column 1410. For each cluster, the selected variable is displayed by name, as shown in column 1420. Two squared correlations are calculated for each cluster. Column 1430, labeled "R-Square With Own Cluster Component," gives the squared correlation of the variable with its own cluster component. The larger the squared correlation shown in 1430, the better. Column 1440, labeled "Next Closest Cluster," identifies the cluster with which the selected variable has the next-highest squared correlation, and column 1450 displays the numerical value of the $R^2$ correlation between the selected variable and that next closest cluster. Generally, the values in column 1450 will be low if the clusters are well-separated. Column 1460, labeled "1−R2 Ratio," displays the ratio:

(1−R2)(own cluster)/(1−R2)(next-closest cluster)

Generally, a small value for the "1−R2 Ratio" indicates a good clustering.

If a user can choose the best variables option for a variable selection property, the variable clustering module will export the best variable per cluster based on the 1−$R^2$ Ratio. Selected variables from each cluster are depicted in column 1420. In this example, it should be noted that the values of 1−$R^2$ Ratio of MOBILE and HEAT are zero at the ratio because there is only one variable in the cluster. Therefore, the successive predictive model can use the best variables from each cluster instead of using cluster components (CLUS1-CLUS11).

Figures 15, 16:
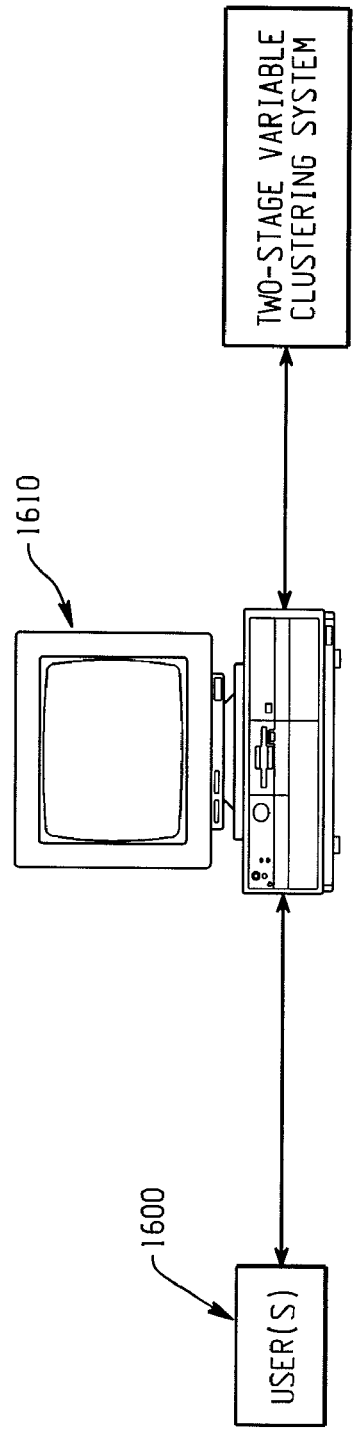

FIG. 15 depicts another user interface that may be used when a two-stage variable clustering module is deployed within a larger analytical framework. For example, EM53 provides interactive selection functionality, wherein each cluster can be viewed through an editable selection table. For example, the cluster 6 is depicted in the table of FIG. 15. It is worth noting that cluster components are always zero at the ratio because the numerator is zero. A user can choose more variables or cluster components at a time by using the interactive selection editor. For example, the following cluster export cluster component (Variable=CLUS6) is the best representative variable for cluster 6. However, the NUMKIDS variable has a very low squared correlation with its cluster component, so a user might add the variable to the predictive model with a slight chance of a collinearity problem. Alternatively, a user can choose either PROMO7 or PROMO13 instead of cluster components because both promo variables are strongly related to the cluster component, and choosing actual variables increases the interpretability of predictive models.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting.

It is further noted that the systems and methods may be implemented on various types of computer architectures, such as for example on a single general purpose computer (as shown at 1610 on FIG. 16) or workstation, operated by one or more users 1600, or on a networked system, or in a client-server configuration, or in an application service provider configuration.

Further, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

In addition, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program. For example, the various cluster structures described herein can be stored in one or more data structures, such as in the following manner. A computer-readable storage medium has stored thereon cluster data structures that are created based upon a data set containing a plurality of input variables, the data structure comprising: a first data structure containing the data set; a second data structure containing one or more global clusters created by computing a distance matrix from the data set; a third data structure containing a global cluster structure; a fourth data structure containing a sub-cluster structure; and a fifth data structure containing a cluster structure formed by combining the global cluster structure and the sub-cluster structure; wherein the global cluster structure and the sub-cluster structure are created using a latent variable clustering technique.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for reducing dimensionality of a data set, comprising:
    accessing, using one or more data processors, a data set including a plurality of observations, wherein each observation has an associated number of attributes, wherein each attribute has a corresponding value, and wherein a number of attributes represents a dimensionality;

generating, using the one or more data processors, a similarity matrix using the data set, wherein the similarity matrix identifies degrees of similarity among the attributes;

generating, using the one or more data processors, global clusters of attributes using the similarity matrix, wherein a global cluster includes a subset of the attributes, and wherein the attributes are grouped in the global clusters according to the degrees of similarity;

generating, using the one or more data processors, a global cluster structure using the global clusters of attributes, wherein generating the global cluster structure includes determining a component for each global cluster of attributes, and performing a latent variable technique using the components;

generating, using the one or more data processors, a sub-cluster structure using the global clusters of attributes, wherein generating a sub-cluster structure includes performing the latent variable technique or a different latent variable technique on each global cluster of attributes; and combining, using the one or more data processors, the global cluster structure and the sub-cluster structure to generate a cluster structure that has a fewer number of attributes than the accessed data set, wherein the fewer number of attributes represents a reduced dimensionality.

2. The method of claim 1, wherein the global clusters of attributes are homogeneous groups of attributes.

3. The method of claim 1, wherein the similarity matrix is a distance matrix, correlation matrix, or a covariance matrix.

4. The method of claim 1, wherein a pre-defined number of global clusters of attributes are generated.

5. The method of claim 4, wherein the pre-defined number of global clusters of attributes is chosen based upon a pre-selected criterion.

6. The method of claim 5, wherein the pre-selected criterion is a cubic clustering criterion (CCC).

7. The method of claim 1,
wherein latent variables are generated by the latent variable technique or the different latent variable technique; and
wherein the latent variables are used to generate the global cluster structure and the sub-cluster structure.

8. The method of claim 1, wherein the components are principal components or centroid components.

9. The method of claim 1, wherein the latent variable technique and the different latent variable technique include factor analysis, principal component analysis, or simple unweighted average of variables.

10. The method of claim 1, wherein generating the sub-cluster structure includes determining a component for each sub-cluster of the global clusters of attributes.

11. The method of claim 1,
wherein the attributes of the accessed data set are independent variables for predicting a target within a prediction model; and
wherein the attributes of the combined cluster structure are independent variables for predicting the target within the prediction model.

12. The method of claim 11, wherein the prediction model provides predictions of whether a customer is likely to purchase a product or service.

13. The method of claim 11, further comprising:
using the cluster structure to perform a data mining operation.

14. A system for reducing dimensionality of a data set, comprising:
one or more processors;
one or more non-transitory computer-readable storage mediums containing instructions configured to cause the one or more processors to perform operations including:
accessing a data set including a plurality of observations, wherein each observation has an associated number of attributes, wherein each attribute has a corresponding value, and wherein a number of attributes represents a dimensionality;
generating a similarity matrix using the data set, wherein the similarity matrix identifies degrees of similarity among the attributes;
generating global clusters of attributes using the similarity matrix, wherein a global cluster includes a subset of the attributes, and wherein the attributes are grouped in the global clusters according to the degrees of similarity;
generating a global cluster structure using the global clusters of attributes, wherein generating the global cluster structure includes determining a component for each global cluster of attributes, and performing a latent variable technique using the components;
generating a sub-cluster structure using the global clusters of attributes, wherein generating a sub-cluster structure includes performing the latent variable technique or a different latent variable technique on each global cluster of attributes; and
combining the global cluster structure and the sub-cluster structure to generate a cluster structure that has a fewer number of attributes than the accessed data set, wherein the fewer number of attributes represents a reduced dimensionality.

15. A non-transitory computer program product for reducing dimensionality of a data set, tangibly embodied in a machine-readable non-transitory storage medium, including instructions configured to cause a data processing system to:
access a data set including a plurality of observations, wherein each observation has an associated number of attributes, wherein each attribute has a corresponding value, and wherein a number of attributes represents a dimensionality;
generate a similarity matrix using the data set, wherein the similarity matrix identifies degrees of similarity among the attributes;
generate global clusters of attributes using the similarity matrix, wherein a global cluster includes a subset of the attributes, and wherein the attributes are grouped in the global clusters according to the degrees of similarity;
generate a global cluster structure using the global clusters of attributes, wherein generating the global cluster structure includes determining a component for each global cluster of attributes, and performing a latent variable technique using the components;
generate a sub-cluster structure using the global clusters of attributes, wherein generating a sub-cluster structure includes performing the latent variable technique or a different latent variable technique on each global cluster of attributes; and
combine the global cluster structure and the sub-cluster structure to generate a cluster structure that has a fewer number of attributes than the accessed data set, wherein the fewer number of attributes represents a reduced dimensionality.

* * * * *